United States Patent
O'Neill et al.

(10) Patent No.: US 7,688,833 B2
(45) Date of Patent: Mar. 30, 2010

(54) SYNCHRONOUS TRANSMISSION NETWORK NODE

(75) Inventors: Shane J O'Neill, Belfast (GB); Paul Linehan, Belfast (GB); Mark Carson, Belfast (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1399 days.

(21) Appl. No.: 10/280,177

(22) Filed: Oct. 24, 2002

(65) Prior Publication Data

US 2004/0042462 A1 Mar. 4, 2004

Related U.S. Application Data

(60) Provisional application No. 60/407,076, filed on Aug. 30, 2002.

(51) Int. Cl.
*H04L 12/28* (2006.01)
*H04L 12/56* (2006.01)
*H04J 3/16* (2006.01)
*H04J 3/22* (2006.01)

(52) U.S. Cl. .................... 370/395.51; 370/466

(58) Field of Classification Search . 370/395.5–395.52, 370/395.71, 412–413, 419, 429, 466, 467, 370/469, 395.53, 395.54; 709/230
See application file for complete search history.

(56) References Cited

U.S. PATENT DOCUMENTS

| | | | | |
|---|---|---|---|---|
| 5,619,650 A * | 4/1997 | Bach et al. | ................... | 709/246 |
| 5,809,021 A * | 9/1998 | Diaz et al. | ................... | 370/364 |
| 6,011,802 A * | 1/2000 | Norman | ....................... | 370/466 |
| 6,014,708 A * | 1/2000 | Klish | .......................... | 709/232 |
| 6,058,119 A * | 5/2000 | Engbersen et al. | ........... | 370/466 |
| 6,603,776 B1 * | 8/2003 | Fedders et al. | .............. | 370/476 |
| 6,625,167 B1 * | 9/2003 | Hasani | ........................ | 370/466 |
| 6,717,953 B1 * | 4/2004 | Heuer et al. | ................. | 370/466 |
| 6,741,610 B1 * | 5/2004 | Volftsun et al. | ............. | 370/466 |

(Continued)

FOREIGN PATENT DOCUMENTS

EP  1 039 775 A2  9/2000

(Continued)

OTHER PUBLICATIONS

The Metacomputer: Glossary of Terms—http://archive.ncsa.uiuc.edu/Cyberia/MetaComp/MetaGlossary.html, 1995 University of Illinois NCSA (retrieved Jun. 7, 2009).*

*Primary Examiner*—Seema S Rao
*Assistant Examiner*—Xavier Szewai Wong
(74) *Attorney, Agent, or Firm*—Barnes & Thornburg LLP

(57) ABSTRACT

In order to enable nodes with a single protocol switch core to be used in a synchronous transmission network carrying both SDH and SONET traffic then one option is to convert traffic between protocols at the various network nodes. For example, if the network node has a switch core arranged for SONET, then when SDH traffic arrives at that node it can first be converted to SONET before being processed by the switch core and then converted back to SDH again if required. Known methods of converting between SONET and SDH are not suited for use at egress points of network nodes where pointer alignment processes do not occur. A new method of converting between SONET and SDH is described which overcomes these problems by reordering the position of stuff columns.

4 Claims, 15 Drawing Sheets

U.S. PATENT DOCUMENTS

| | | | |
|---|---|---|---|
| 6,775,296 B1* | 8/2004 | Kitamura | 370/466 |
| 6,894,979 B1* | 5/2005 | Lee | 370/241 |
| 7,023,848 B2* | 4/2006 | Yehuda et al. | 370/390 |
| 7,054,310 B1* | 5/2006 | Shivji et al. | 370/366 |
| 7,058,168 B1* | 6/2006 | Knappe et al. | 379/204.01 |
| 7,072,970 B2* | 7/2006 | Georgiou et al. | 709/230 |
| 7,280,559 B2* | 10/2007 | Arai | 370/466 |
| 7,353,288 B1* | 4/2008 | Rangavajjhala et al. | 709/236 |
| 2001/0021171 A1* | 9/2001 | Notani | 370/222 |
| 2002/0080830 A1* | 6/2002 | Carson et al. | 370/542 |
| 2002/0093910 A1* | 7/2002 | Yazaki et al. | 370/229 |
| 2002/0167900 A1* | 11/2002 | Mark et al. | 370/225 |
| 2003/0048777 A1* | 3/2003 | Ryan et al. | 370/369 |

FOREIGN PATENT DOCUMENTS

| | | |
|---|---|---|
| EP | 1 079 560 A2 | 2/2001 |
| EP | 1079560 A2 * | 2/2001 |
| JP | 05327642 A * | 12/1993 |
| WO | WO 00/24145 | 4/2000 |

* cited by examiner

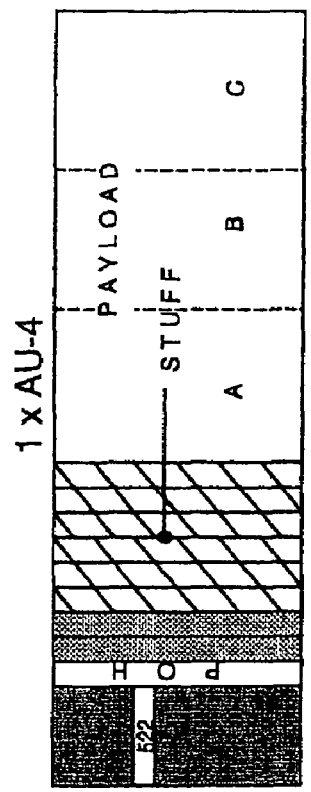
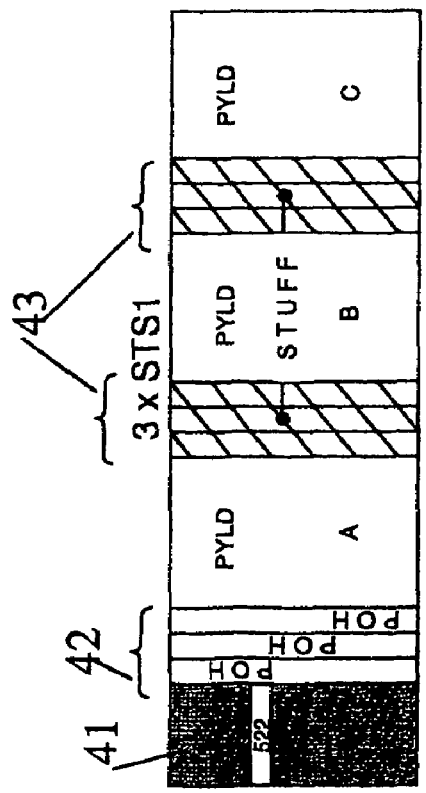
Column Alignment of VC/SPE performed, start position of every frame now known.
PYLD - Payload
Figure 4b
Figure 4a SONET -> SDH Conversion (VT – TU)

Implementation :

Implementation contd.

Example: VT – TU Conversion (3xSTS1 – AU-4)

Implementation contd.

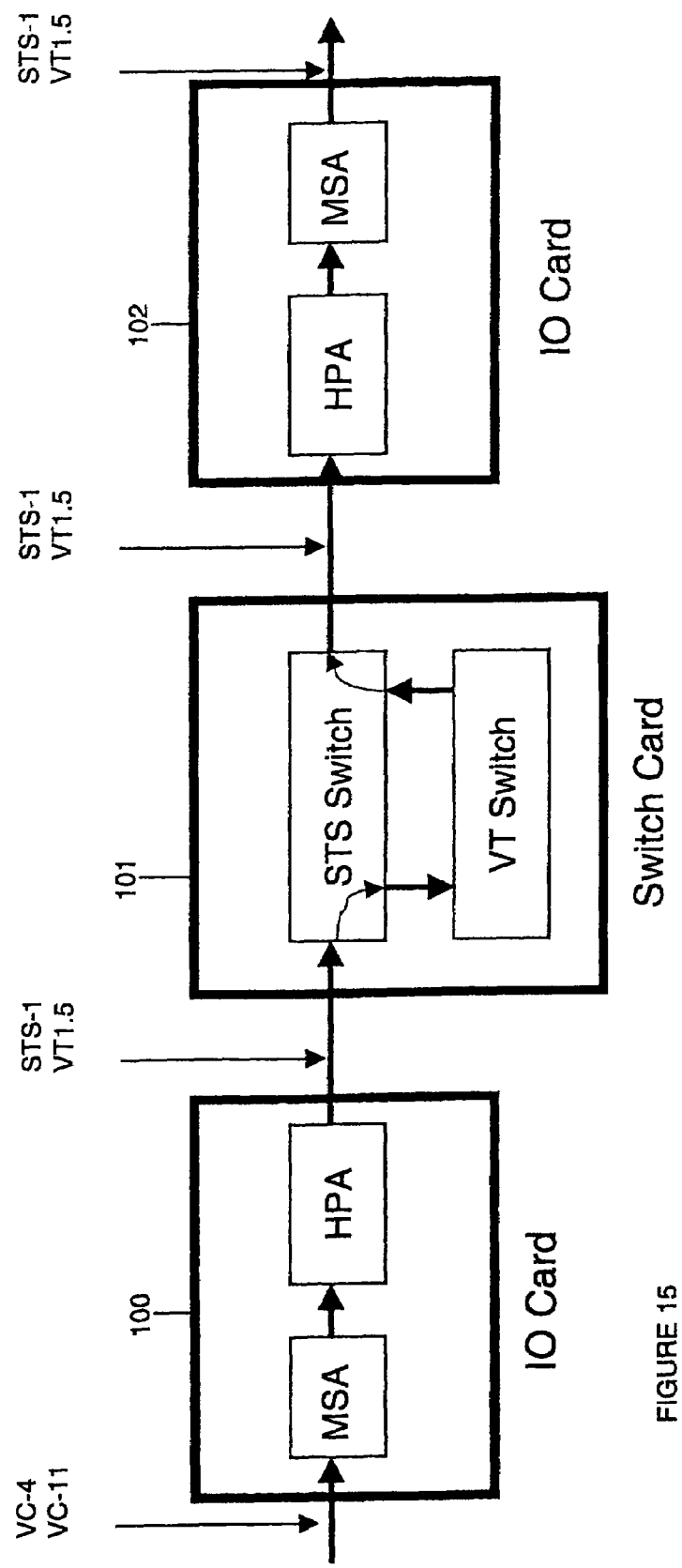

SYNCHRONOUS TRANSMISSION NETWORK NODE

RELATED APPLICATION

This application is the full utility filing of U.S. provisional application No. 60/407,076 filed on Aug. 30, 2002, from which the present application claims priority and which is incorporated herein by reference.

FIELD OF THE INVENTION

The present invention relates to communications network nodes for use in synchronous transmission networks and which are operable for more than one protocol type.

BACKGROUND TO THE INVENTION

SDH and SONET are both examples of protocols suitable for use in sending data over synchronous transmission networks. Such networks comprise a plurality of network elements (also referred to as nodes) connected together by optical fibre or any other suitable type of connection. Each node comprises a synchronous transmission apparatus, or network equipment, in the form of, for example, a multiplexer, a cross-connect, a regenerator, or other signal processing or switching apparatus. The synchronous transmission apparatus, or network elements, incorporated in the network are typically synchronised (locked in frequency but not in phase) to an overall network clock.

The SONET (Synchronous Optical Network) Standard defined by ANSI (American National Standards Institute) is similar in many respects to the SDH (Synchronous Digital Hierarchy) standard defined by the ITU-T (International Telecommunications Union Telecommunications Standardization Sector). One key difference, however, is the respective basic unit of payload. In SONET, the basic unit is an STS-1, which offers a bandwidth of approximately 50 Mbit/s. With SDH, the basic unit is an AU-4, which offers a bandwidth of approximately 150 Mbit/s. SDH channels with smaller bandwidths are available and are provided by, for example, basic units known as TU-12 (approximately 2 Mbit/s) and TU-2 (approximately 6 Mbit/s). However, TU-12s and TU2s are carried within VC-4s which, in turn, are carried within AU-4s. The TU-12s and TU-2s are therefore referred to as low order data structures, the VC-4 being a high order data structure.

In SONET an STS-1 can be used to carry equivalent low order structures known as Virtual Tributaries (VTs) where a VT2 is equivalent to a TU-12 and a VT6 is equivalent to a TU-2.

The temporary conversion of payloads from SDH to SONET and back to SDH within a node may also be regarded as a conversion from the de-facto preferred SDH multiplexing structure, based on the AU-4, to the non-preferred structure, based on the AU-3, and back again. The SDH AU-3 is structurally identical to a SONET STS-1, but the meanings associated with some bits and bytes in the two payload types are different. For clarity, this description will always refer to the converted data as SONET.

It is advantageous to provide a synchronous transmission network which is operable for both SDH and SONET in order to provide greater flexibility. It is also desired to provide a network node which can be used in either a SONET only network or an SDH only network, but without increasing the complexity and cost of the network node.

However, it is also advantageous to use nodes in such a synchronous transmission network which have a single protocol switch core. This simplifies the switch cores and so keeps development and manufacture costs down. However, previously it has not been possible to provide such a node with a single-protocol switch core that can be used in either an SDH only or a SONET only network.

The invention seeks to provide an improved method and apparatus for converting between SONET and SDH which overcomes or at least mitigates one or more of the problems noted above.

The invention also seeks to provide a network node for a synchronous transmission network, whereby the network node is able to carry both SDH and SONET traffic whilst having a single protocol switching core.

An object of the invention is to provide a synchronous transmission network comprising a plurality of nodes each having a single protocol switch core and which overcomes or at least mitigates one or more of the problems mentioned above.

Further benefits and advantages of the invention will become apparent from a consideration of the following detailed description given with reference to the accompanying drawings, which specify and show preferred embodiments of the invention.

SUMMARY OF THE INVENTION

The term "column" is used to refer to either a single byte as in an STS1 or a series of 3 bytes as in a VC4.

According to an aspect of the invention there is provided a communications network node for use in a synchronous transmission network and arranged to operate with traffic of at least two different protocol types, said network node comprising:

a single-protocol switch core operable for one of said protocol types; and a conversion processor arranged to convert traffic between said two protocol types; said conversion processor at least being operable on an egress of the network node.

This provides the advantage that a network node is provided which can be used in synchronous transmission networks of different protocol types. This is achieved without the need to provide a multi-protocol switch core at the node and hence costs and complexity are reduced.

The term "conversion processor" is used herein to refer to an apparatus or device which changes traffic from a first protocol type into a form suitable to be switched by a node with a switch core of a second protocol type. For example, this conversion does not necessarily need to be a full conversion from the first to the second protocol type. This is explained in detail below.

According to an aspect of the invention there is provided a synchronous transmission network arranged to carry traffic of at least a first protocol type, said network comprising:

a plurality of network nodes connected to one another by links and wherein each of those network nodes comprises a single-protocol switch core arranged to operate for a second protocol type, different from said first protocol type;

at least one conversion processor provided at each of said network nodes and arranged to convert the traffic between the first and second protocol types; said conversion processor at least being operable on an egress of each network node.

This provides the advantage that the synchronous transmission network can be made up of network nodes with for example, SONET only switch cores whilst at the same time, SDH traffic can be carried over the network. This enables single-protocol switch cores to be used which are simpler and less expensive than multi-protocol switch cores which would otherwise be needed. The invention enables these single-protocol switch cores to be used by providing for a conversion process at each network node. Thus a manufacturer is able to provide a network node with a single-protocol switch core that is compatible with either a SONET only or an SDH only network. This is achieved without the need to provide that node with a multi-protocol switch core.

Preferably each of said network nodes comprises a single-protocol switch core operable for the same protocol type. For example, the network comprises network nodes all with SONET only switch cores. However, this is not essential. It is also possible to have some nodes with SONET only switch cores and others with SDH only switch cores.

According to another aspect of the invention there is provided a method of carrying traffic of at least a first protocol type over a synchronous transmission network, said network comprising a plurality of network nodes connected to one another by links and each comprising a single-protocol switch core operable for a second protocol type different from said first protocol type, said method comprising the steps of:

receiving traffic at one of the network nodes and if said traffic is of a protocol type different from that of the single-protocol switch core of the network node, then converting that traffic into a form compatible with that of the single-protocol switch core;

processing the traffic at the single-protocol switch core of the network node; and if said traffic was converted before being processed by the single-protocol switch core, then converting the output of the single-protocol switch core back into the protocol type of the received traffic.

This provides the same advantages as described above. For example, a network where all the nodes have SONET only switch cores can be used to transport SDH traffic.

For example, SDH traffic received at a SONET only switch core is first converted to SONET form before being processed by the switch core. It is then converted back to SDH form before being output to the network.

According to another aspect of the present invention there is provided a method of converting between a first type of synchronous data transmission payload container structure and a second type of synchronous data transmission payload container structure. This method can be used in conjunction with the method of carrying traffic described above. Each of the types of payload container structures comprises at least two columns of stuff data and with the position of the stuff data columns being different between the two types, said method comprising the steps of:

writing data from a payload container of the first type into at least one data store;

reading data from the at least one data store and inserting that read data into an output payload container structure of the second type such that as a result of use of the data store, a delay is created; and writing stuff data into the output payload container at particular times such that the position of the stuff data in the output payload container is different from that in the payload container of the first type.

This method of converting is much less resource intensive that previous methods and is simple to implement on an egress path from an optical or other network node. This enables nodes with a single protocol switch core to be used for multi-protocol synchronous transmission networks. The design of the switch core is therefore simplified and this is extremely advantageous in terms of costs, design effort and design flexibility.

For example, the first type of synchronous data transmission payload container structure is a synchronous digital hierarchy (SDH) payload container and the second type of synchronous data transmission payload container structure is a synchronous optical network (SONET) payload container.

In one embodiment the method comprises converting from a SONET payload container to an SDH payload container. In this case the following steps are used:

transferring a path overhead information from the SONET payload container to the SDH payload container;

inserting two items of stuff data into the SDH payload container;

inserting two columns comprising six bytes of stuff data into the SDH payload container and in the meantime storing two columns of data from the SONET payload container using two data stores.

This method can be repeated such that multiples of six bytes of stuff data are inserted.

After this the method comprises transferring the columns of data stored in the data stores to the SDH payload container and in the meantime storing two columns of data from the SONET payload container using the two data stores.

When a first column of stuff data is reached in the SONET payload container, the method involves omitting to transfer this data to the data stores such that the method continues using only one of the data stores.

When a second column of stuff data is reached in the SONET payload container, the method involves omitting to transfer this data to the data stores such that the method continues without using the data stores and simply transferring data from the SONET payload container to the SDH payload container.

A column alignment process is carried out in advance of the method of converting between the two types of payload container structure. Any suitable column alignment process can be used as known in the art.

The invention also provides an apparatus for converting between a first type of synchronous data transmission payload container structure and a second type of synchronous data transmission payload container structure. This apparatus can be used with the synchronous transmission network described above. Each of the types of payload container structures comprising at least two columns of stuff data and with the position of the stuff data columns being different between the two types, said apparatus comprising:

at least one data store;

a first processor arranged to write data from a payload container of the first type into the data store;

a second processor arranged to read data from the data store and inserting that read data into an output payload container structure of the second type such that as a result of use of the data store, a delay is created; and a third processor arranged to write stuff data into the output payload container at particular times such that the position of the stuff data in the output payload container is different from that in the payload container of the first type.

Preferably the apparatus takes the form of an application specific integrated circuit (ASIC) or a field programmable gate array (FPGA) and the data store is selected from a random access memory (RAM), an addressable data array, and a register file.

According to another aspect of the invention there is provided an optical communications network node comprising an apparatus as specified above.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 4a is a schematic diagram of the SONET frame of FIG. 3a after column alignment has taken place.

FIG. 4b is a schematic diagram of the SDH frame of FIG. 3b after column alignment has taken place.

FIG. 5a is a schematic diagram of a SONET payload container before conversion to an SDH payload container according to the present invention.

FIG. 5b is a schematic diagram of an SDH payload container produced as a result of conversion from the SONET payload container of FIG. 5a;

FIG. 10a is a schematic diagram of an SDH payload container before conversion to a SONET payload container;

FIG. 10b is a schematic diagram of a SONET payload container produced as a result of conversion from the payload container of FIG. 10a;

FIG. 15 is a schematic diagram of a network node according to the prior art for making a VC11 to VT1.5 connection. This is used in the present invention along with the embodiment of FIG. 14 to provide a bi-directional VT1.5 to VC-11 conversion.

DETAILED DESCRIPTION OF INVENTION

Embodiments of the present invention are described below by way of example only. These examples represent the best ways of putting the invention into practice that are currently known to the Applicant although they are not the only ways in which this could be achieved.

The term "stuff data" is used to refer to regions of the payload that are unused and typically are filled with zeros when created and are ignored when received at a receiver.

As mentioned above, the present invention seeks to provide a network node which can be used in networks of different protocol type, but without increasing the cost and complexity of the node. It is particularly desired to create a node which can be used in either SONET only or SDH only networks and which has a single-protocol switch core.

In order to enable nodes with a single protocol switch core to be used in a synchronous transmission network carrying both SDH and SONET traffic then one option is to convert traffic between protocols at the various network nodes. For example, if the network node has a switch core arranged for SONET, then when SDH traffic arrives at that node it can first be converted to SONET before being processed by the switch core and then converted back to SDH again if required.

At least one conversion method for converting SDH to SONET is known. This method is advantageously integrated with a pointer alignment operation and involves using an elastic store. Typically a pointer alignment process occurs on entry of traffic to a network node and so conversion from SDH to SONET can be accommodated at this point. An elastic store and a pointer processor are used to find and reorder the relevant bytes from one frame format to the other. However, the method of conversion is complex and resource intensive and for these reasons not practical for use in situations where the pointer alignment process is not already needed. Such a situation arises when traffic is leaving a network node. Thus converting in the opposite direction, i.e. from SONET to SDH at an egress point where traffic is leaving a network node is problematic.

Previously, network nodes which convert between SONET and SDH have been deployed at the boundary between a SONET and an SDH region of a synchronous transmission network. In this situation the network node has a multi-protocol switch core which is able to process both SDH and SONET traffic. However, this type of switch core is complex and expensive.

The present invention overcomes these problems by using a conversion processor at the single-protocol switch cores. This is described in more detail below.

Figure 1:
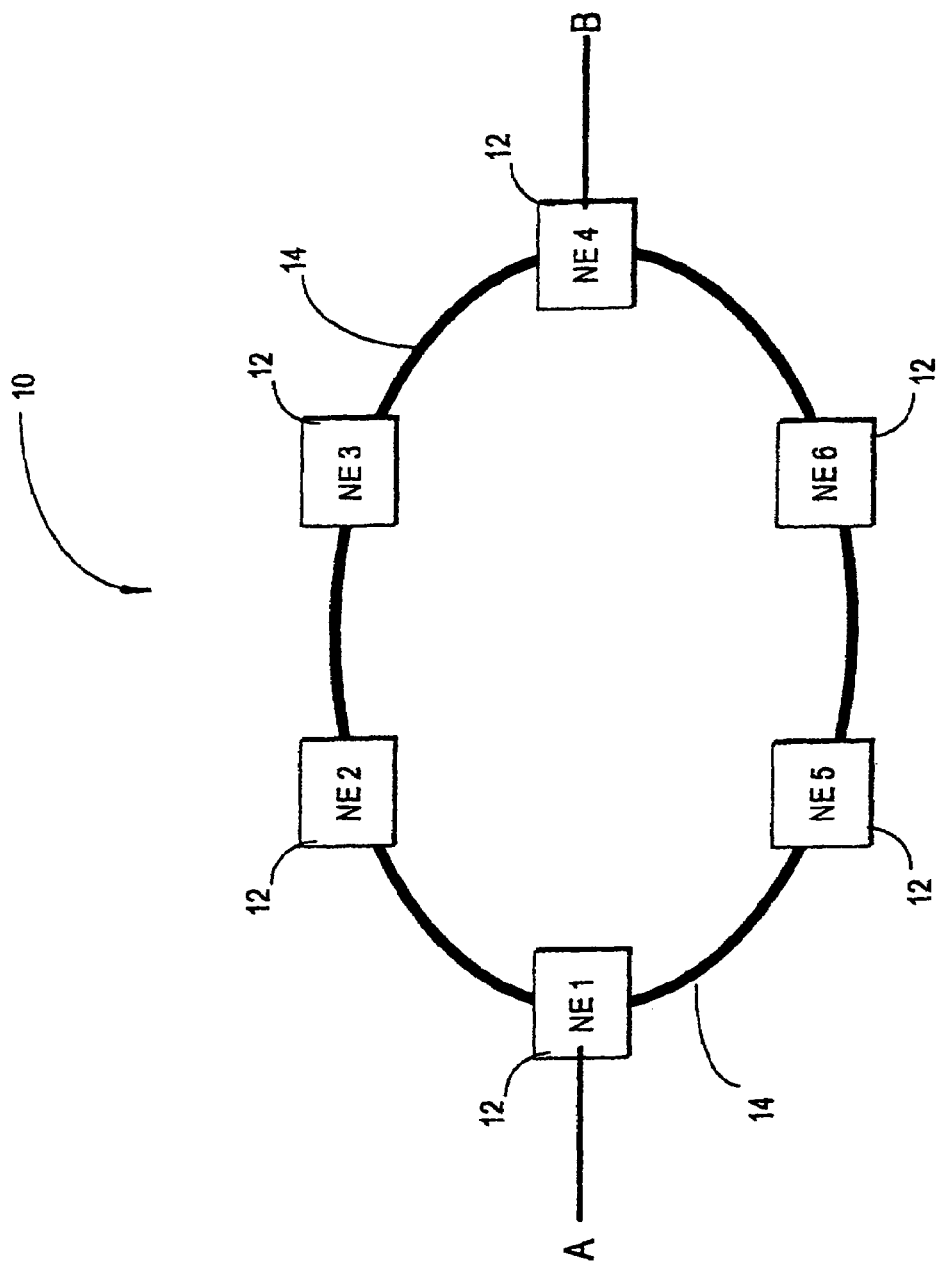
FIG. 1 is a schematic diagram of a synchronous transmission network.

FIG. 1 is a schematic diagram of a synchronous transmission network 10 comprising a plurality of network nodes 12 interconnected by sections 14 which may be optical fibre for example. Each node 12 comprises a synchronous transmission apparatus, or network equipment, in the form of, for example, a multiplexer, a cross-connect, or other signal processing or switching apparatus. All of these types of network equipment comprise a switching core and in the embodiments described herein, those switching cores are all operable for a single protocol only which is preferably either SDH or SONET although any other suitable protocol can be used. It is not essential for all the switching cores in the network 10 to be operable for the same single protocol. For example, some may be operable for SDH only and some for SONET only. However limitations are introduced when using switching cores of different single protocols and the present invention seeks to address those. The present invention is applicable to network nodes and equipment involved in the switching or processing of low order data types.

In a preferred example each of the network nodes 12 comprises a single-protocol switch core of the same protocol type, such as SONET. The network is however arranged to carry traffic of a different protocol type from that of the switch cores if required (of course, the network could alternatively carry traffic of the same protocol type as the switch cores, as known in the art). For example, it is arranged to carry SDH traffic. This provides the advantage that simple, cost effective switch cores are used whilst at the same time, traffic of either SDH or SONET type can be carried. A network node which is compatible with networks of different protocol type is then provided, without the need to use a multi-protocol switch core in that network node.

A conversion processor is provided at each switch core to convert between the two protocol types as required. For example, if the switch cores are all SONET only then at the ingress of the switches, conversion from SDH to SONET form takes place in the case that the network carried SDH traffic. The switch core is then able to process the converted traffic as known in the art. The output from the switch core is then converted back to SDH form before being sent out to the network again.

As mentioned above the conversion does not necessarily have to be a full conversion between protocol types. It is acceptable to convert a first protocol type into a form suitable to be switched by a node with a switch core of a second protocol type. For example, SDH uses a container structure referred to as a VC-12 and a byte in this container referred to as J2 carries a path trace message. SONET has no equivalent byte in its container referred to as a VT2. In the case of a full conversion from VC12 to VT2 then the J2 byte needs to be removed. However, in the present invention this is not essential. The J2 byte can be left unchanged and switching carried out at a SONET switch core after conversion of the SDH container into "partial" SONET form. Because the J2 byte remains it is then simple to use this byte when a conversion of the VT2 (SONET form) to VC-12 (SDH form) is carried out at the egress of the network node.

Figure 2:
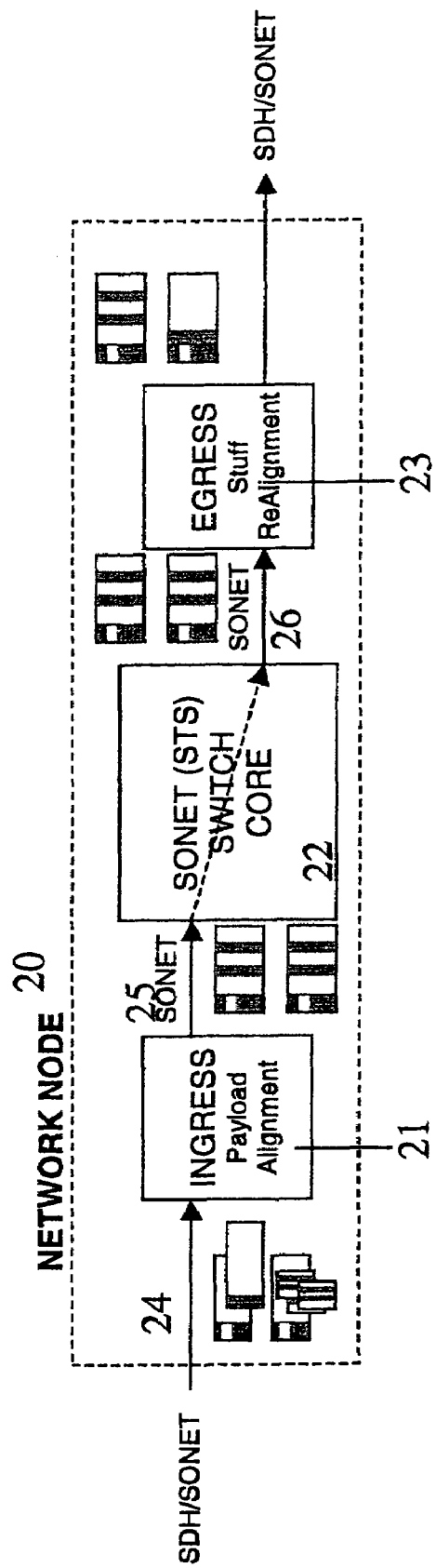
FIG. 2 is a schematic diagram of a communications network node with a SONET switch core and arranged to carry out conversion between SDH and SONET.

FIG. 2 shows components of a network node 20.

The network node 20 can be considered as comprising an input or ingress 21, a switch core 22, and an output or egress 23. In this example, we will assume that the switch core 22 is arranged to operate for SONET only. Traffic 24 is received at the input 21 in either SDH or SONET form and the ingress 21 is arranged to convert any received SDH traffic into SONET format by carrying out payload alignment. The SONET format traffic 25 is then passed to the cross-connect core 22 which processes that traffic as known in the art and forwards it 26 to the egress 23. The egress 23 is arranged to convert the traffic that was originally in SDH form back to that form. The present invention is particularly applicable to SDH networks in which the network nodes have single protocol switch cores operable with SONET protocol.

By allowing SDH to SONET conversion as illustrated in FIG. 2 and vice versa at the ingress and egress of the switching core of a network node, the design of the core is greatly simplified, as support for only one frame structure is necessary.

Figures 3A, 3B:
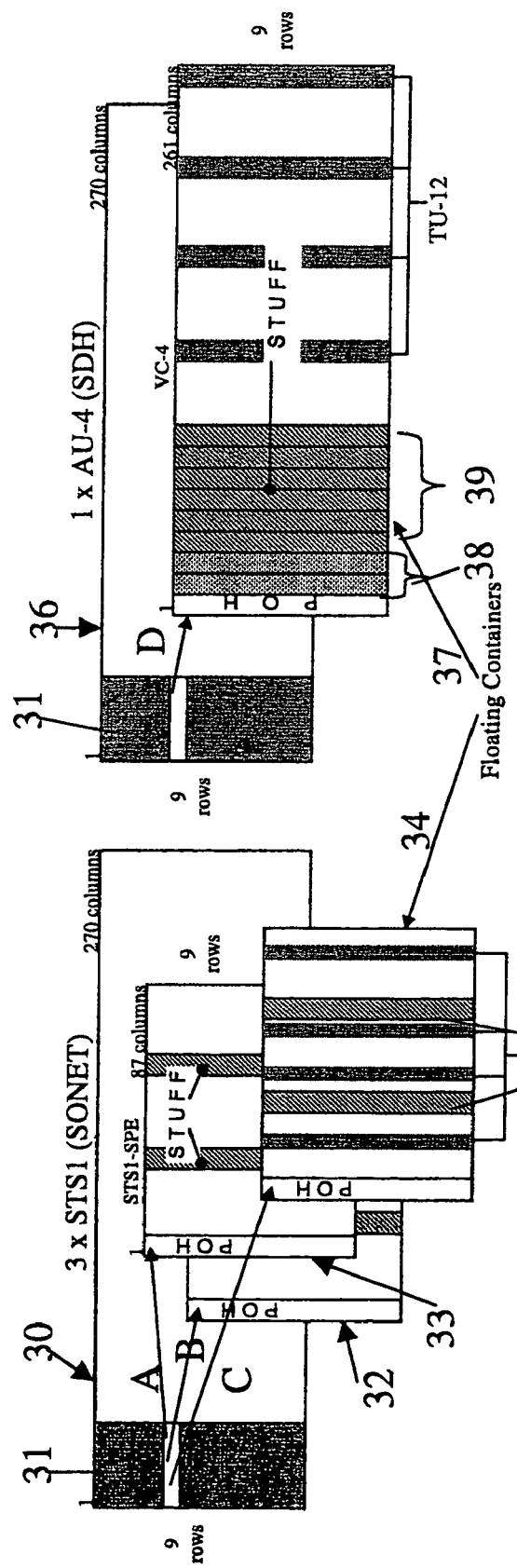
FIG. 3a is a schematic diagram of a SONET frame with three floating payload containers.
FIG. 3b is a schematic diagram of an SDH frame with one floating payload container.

FIG. 3a is a schematic diagram of a SONET frame structure comprising three STS1's and FIG. 3b is a similar diagram for an SDH frame structure comprising an AU-4. These structures are as known in the art and defined in the standards mentioned below. FIGS. 3a and 3b are described in detail below but first some background information is given about frame structures, tributary units and administrative units.

A synchronous data network is arranged to transport data signals, or traffic, which are arranged in accordance with a synchronous frame structure. There are a number of standard frame structures defined by, for example, ITU-T (see ITU-T G.707) and Bellcore (now known as Telcordia) see Telcordia GR2 53, which are commonly used in synchronous transmission systems. In SDH and SONET transmission systems, data signals are packaged, or mapped, into frames known as Synchronous Transport Modules (STMs). An STM frame includes a payload area into which the data signals are mapped in container units. Each container, commonly referred to as a virtual container in SDH terminology, contains one or more data signals and some control information known as path overhead (POH). Smaller virtual containers may be loaded, or nested, within larger virtual containers. Nested containers are known as low order containers, or low order data structures, and the larger containers into which they are nested are known as high order containers, or high order data structures.

The virtual containers are normally arranged in tributary units (TUs) or administrative units (AUs). TUs and AUs are normally arranged in groups known as tributary unit groups (TUGs) and administrative unit groups (AUGs) respectively. TUGs and AUGs are mapped into the payload area of an STM frame. When the STM payload area is full, further control information, known as section overhead, is added to the frame. The purpose of the section overhead is to provide communication channels for functions including operations, administration and maintenance (OA&M) facilities, user channels, protection switching, section performance and frame alignment, between adjacent network nodes 12.

In a synchronous data network, the synchronous transmission apparatus, or network elements, incorporated therein are synchronised (looked in frequency but not in phase) to an overall network clock. However, the timing of the data signals that are mapped into the virtual containers may vary slightly with respect to the network clock. Further, the delay associated with a transmission link may vary slightly with time. Hence, the location of virtual containers within an STM frame may not be fixed. For example, a virtual container (VC) may move relative to its SDH frame due to loss of synchronization within the network, phase delays caused by diurnal expansion of optical fibres, or jitter.

Such variations are accommodated by associating a pointer with each virtual container. A pointer, which is included in a TU and an AU, and which comprises a plurality of data bits, indicates the position of the beginning of a respective virtual container with respect to its STM frame, and more specifically, with respect to the TU or AU as appropriate. A pointer can be incremented, decremented or otherwise adjusted, as appropriate, to accommodate for movements of the position of its virtual container within an STM-N frame. Thus, the pointer indicates the position of the VC within the STM-N frame and is adjusted as the VC enters a network node (for example, a multiplexer) to indicate the position of the VC relative to the nodal clock. This enables the network node to locate, switch, de-map, or otherwise process the VC. This process is known as pointer processing.

In general, in SDH networks, an AU-4 structure may be used to carry low order traffic such as TU-2s and TU-12s. In SONET networks an STS1 structure may be used for low order traffic such as VT6s and VT2s. In terms of physically switching traffic, TUs and VTs are structurally the same. However, their high order containers, AU4s and STS1s, differ, making switching of low order traffic in mixed SONET/SDH networks more complicated.

FIG. 3a shows a SONET frame comprising three STS1s. There is a fixed frame structure 30, in this example comprising 9 rows and 270 columns. A section overhead (also known as a transport overhead) 31 of this frame structure 30 contains in this example, three pointers indicated by arrows A, B, C, one to each of three floating payload containers 32, 33, 34. In this example, the floating payload containers 32, 33, 34 comprise VT2s. Each floating container has a path overhead indicated by the column labelled POH, data for transmission indicated by white regions and stuff columns 35 containing unused bytes.

FIG. 3b shows an SDH frame comprising an AU-4. The AU-4 is a fixed frame structure 36 similar to that of FIG. 3a comprising 9 rows and 270 columns. Again a section overhead 31 of this frame structure 36 contains a pointer indicated by arrow D to a floating payload container 37. In this example the floating payload container comprises a TU-12. A path overhead indicated by the column labelled POH is provided followed by two blank columns 38 and six stuff columns 39.

By comparing FIGS. 3a and 3b it can be seen that the floating payload containers of the SDH and SONET frames have different structures with the stuff columns in SDH being located at the front of the container whereas in SONET those stuff columns are spaced through the payload containers. The present invention provides a method whereby the payload containers in SDH format (as in FIG. 3b) can be converted into SONET format (as in FIG. 3a) or vice versa. This is achieved in a simple and effective manner by reordering the position of the stuff columns.

As known in the art, ingress traffic received at a node in an SDH or SONET network is first processed to align the pointers that point to the floating payload containers. This gives the advantage that the traffic streams can be more easily switched. A VTTU synchroniser in the form of an application specific integrated circuit (ASIC) is used as known in the art to align all the high order containers to a specified pointer (preferably pointer 522) which fixes the first byte of each floating payload container to the top left hand side of the frame (excluding the section overhead region). The alignment also fixes the position of the stuff bytes within the frames allowing those stuff bytes to be found by a simple column counter. The results of this alignment process are illustrated in FIGS. 4a and 4b.

FIG. 4a is a schematic diagram of a SONET frame as in FIG. 3a after the floating payload containers are aligned to pointer 522. The path overhead (POH) columns 42 from each floating payload container are now positioned after the section over head region 41. There are three payload regions A, B, C each containing actual data to be transmitted and these payload regions are each separated by a stuff column.

FIG. 4b is a schematic diagram of an SDH frame as in FIG. 3b after the floating payload container has been aligned to pointer 522. This diagram is the same as FIG. 3b except that the payload region is shown as comprising three regions A, B, C corresponding to the three payload regions of the SONET frame in FIG. 4a.

The process of reaching the frames of FIGS. 4a and 4b is referred to as low order pointer processing or column alignment and any suitable method of column alignment can be used as known in the art.

Figures 5A, 5B:
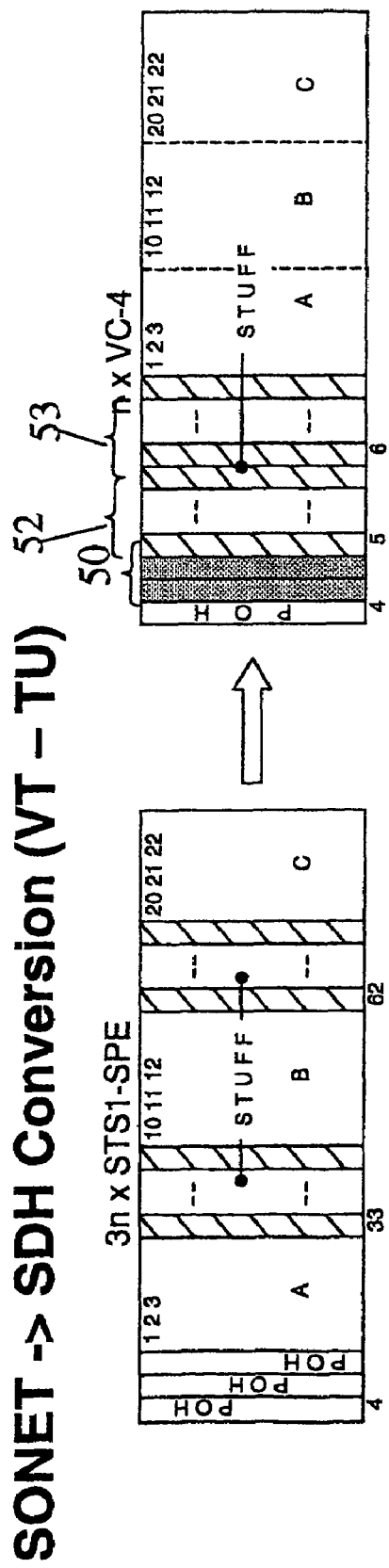

The process by which the present invention enables the structure of FIG. 4a to be converted into the structure of FIG. 4b is now described with reference to FIGS. 5a and 5b. FIG. 5a is a schematic diagram of a SONET frame comprising 3 STS1s. This is the same as the structure illustrated in FIGS. 3a and 4a except that the section overhead region is omitted for clarity. The first three bytes of payload A are labelled 1, 2, 3; the first three bytes of payload B are labelled 10, 11, 12 and the first three bytes of payload C are labelled 20, 21, 22. Also the column numbers are indicated with the first path overhead column being column 1, the first stuff column being column 30 and so on. FIG. 5b is a schematic diagram of the SONET frame of FIG. 5a after conversion to SDH form and omitting the section overhead region for clarity. This structure is the same as that of FIGS. 3b and 4b. Again the first three bytes of each payload and the column numbers are indicated.

The SONET structure of FIG. 5a has three path overhead columns whereas the SDH structure of FIG. 5b only needs one path overhead column. Thus two of the path overhead columns of FIG. 5a are overwritten with blank bytes to form blank columns 50 in FIG. 5b. Also the position of the stuff columns is changed. This is achieved by simply adding six stuff columns after the path overhead columns in the structure of FIG. 5b. The payload data is then inserted but omitting any stuff columns that are present. Also, the structure of FIG. 5a uses three pointers as discussed above whereas for FIG. 5b only one pointer is needed. Therefore the first pointer from the FIG. 5a structure is retained and the remaining two are changed to the concatenation value specified in ITU standard G.707.

By comparing FIGS. 5A and 5b it can be seen that payload A from the structure of FIG. 5a needs to be delayed in order that it can be placed into the structure of FIG. 5b. This is also the case for payload B, although payload B only needs to be delayed half as much as for payload A. Payload C on the other hand does not need to be delayed at all.

Figure 6A:
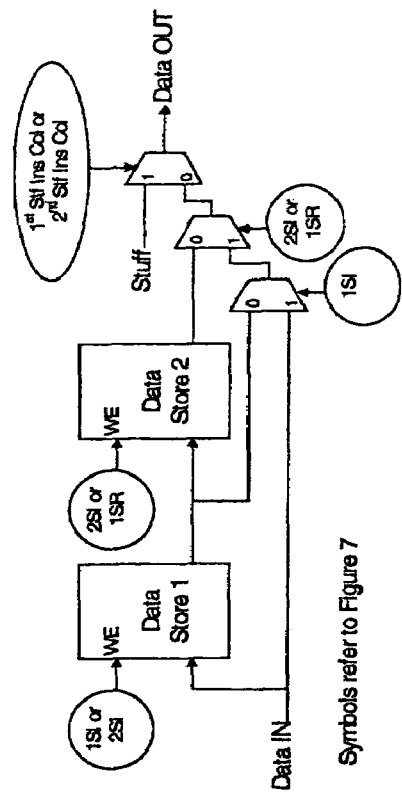
FIG. 6a is a flow diagram of a method of using two data stores to carry out conversion between SONET and SDH according to an embodiment of the invention.
Figure 6B:
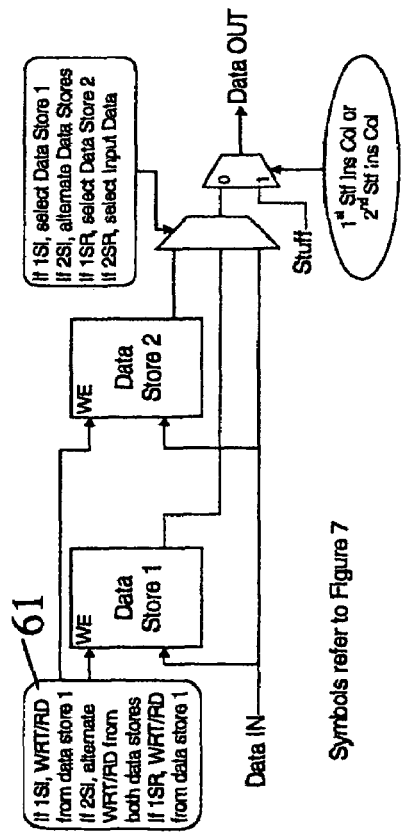
FIG. 6b is a flow diagram of another method of using two data stores to carry out conversion between SONET and SDH according to another embodiment of the invention.

To enable this delaying to be achieved, two data stores are used as illustrated in FIGS. 6a and 6b. Data store 1 and data store 2 acting together delay data for two time intervals whereas an individual data store delays for only one time interval. The data stores are provided using any suitable means such as an addressable data array, random access memory (RAM) or Register File. Both FIGS. 6a and 6b are schematic diagrams of methods of using the two data stores to achieve conversion from SONET to SDH, for example, to convert the structure of FIG. 5a to the structure of FIG. 5b.

Figure 7:
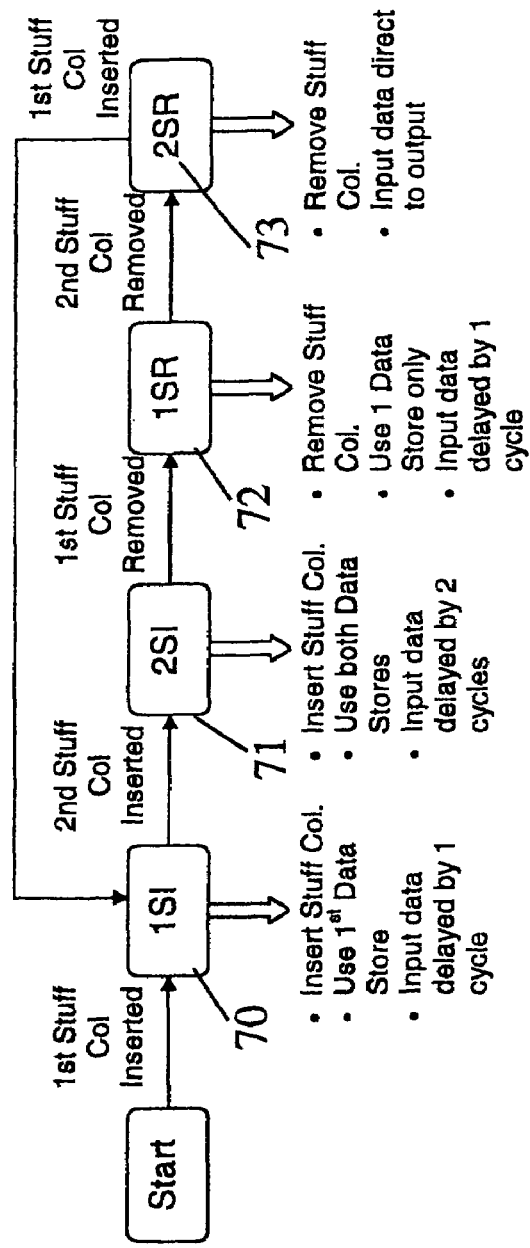
FIG. 7 is a flow diagram of a method of converting between SDH and SONET.

FIG. 7 is a flow diagram of the method of conversion from SONET to SDH using two data stores. In order to convert from the structure of FIG. 5a to FIG. 5b a column of stuff data first needs to be inserted (this corresponds to the column labelled 52 in FIG. 5b). This is indicated by state 70 in FIG. 7. During this time data from the payload in the SONET structure of FIG. 5a is arriving. This data is stored in data store 1 and as a result is delayed by one cycle or time interval. Next another column of stuff data needs to be inserted (this corresponds to the column labelled 53 in FIG. 5b). This process is illustrated by state 71 in FIG. 7. In the meantime data from payload in the SONET structure of FIG. 5a is still arriving. This is stored in data store 2. Thus at this point, the data in data store 1 has been delayed by two time intervals whilst the data in data store 2 has been delayed by one time interval.

Now that the two stuff columns have been inserted into the output structure being created, it is possible to start adding the payload data stored in the data stores and which has been delayed by two time cycles or intervals. This data is added and new data arriving stored in the data stores ready to be removed after the time delay and put into the output data. This process proceeds until stuff data is found in the input. This occurs because the input data is in SONET form and so will have stuff data at the columns indicated in FIG. 5a.

When stuff data is found in the input, state 72 of FIG. 7 is reached. The stuff column is removed simply by not writing this data to either of the data stores. In the meantime, data is taken out of one of the data stores and used for the output. That data store becomes empty. The remaining data store then provides a time delay of only one time interval and the process of taking input data into one of the data stores and outputting it from that store to the output continues. Once more stuff data is reached in the input data state 73 of FIG. 7 is reached. That stuff data is removed by not writing it to the output. This results in both data stores becoming empty and input data is now written straight from the input to the output with no delay.

FIGS. 6*a* and 6*b* show two different ways in which the method of FIG. 7 can be implemented. The implementation of FIG. 6*a* is preferred because it is simpler to realise although either implementation can be used. In the system of FIG. 6*a* input data is either written to data store 1 or to data store 2 but not to both. However, in the system of FIG. 6*b* input data is written to both data stores.

State 61 of FIG. 6*a* indicates that when the situation of state 70 of FIG. 7 occurs then the system is to write or read from data store 1. If the situation of state 71 of FIG. 7 occurs then the system is to write or read from both data stores alternately as described below with reference to FIG. 8. If the situation of state 72 of FIG. 7 occurs then the system is to write or read from only data store 2. Thus in FIGS. 6*a* and 6*b* the symbols 1SI, 2SI, 1SR, 2SR refer to the states of FIG. 7.

In FIG. 6*b* the input data is written to data store 1 and subsequently read from data store 1 and written to data store 2. This provides versions of the data delayed by zero, one or two time intervals which are selected by the multiplexers indicated in FIG. 5*b*.

Figure 8:
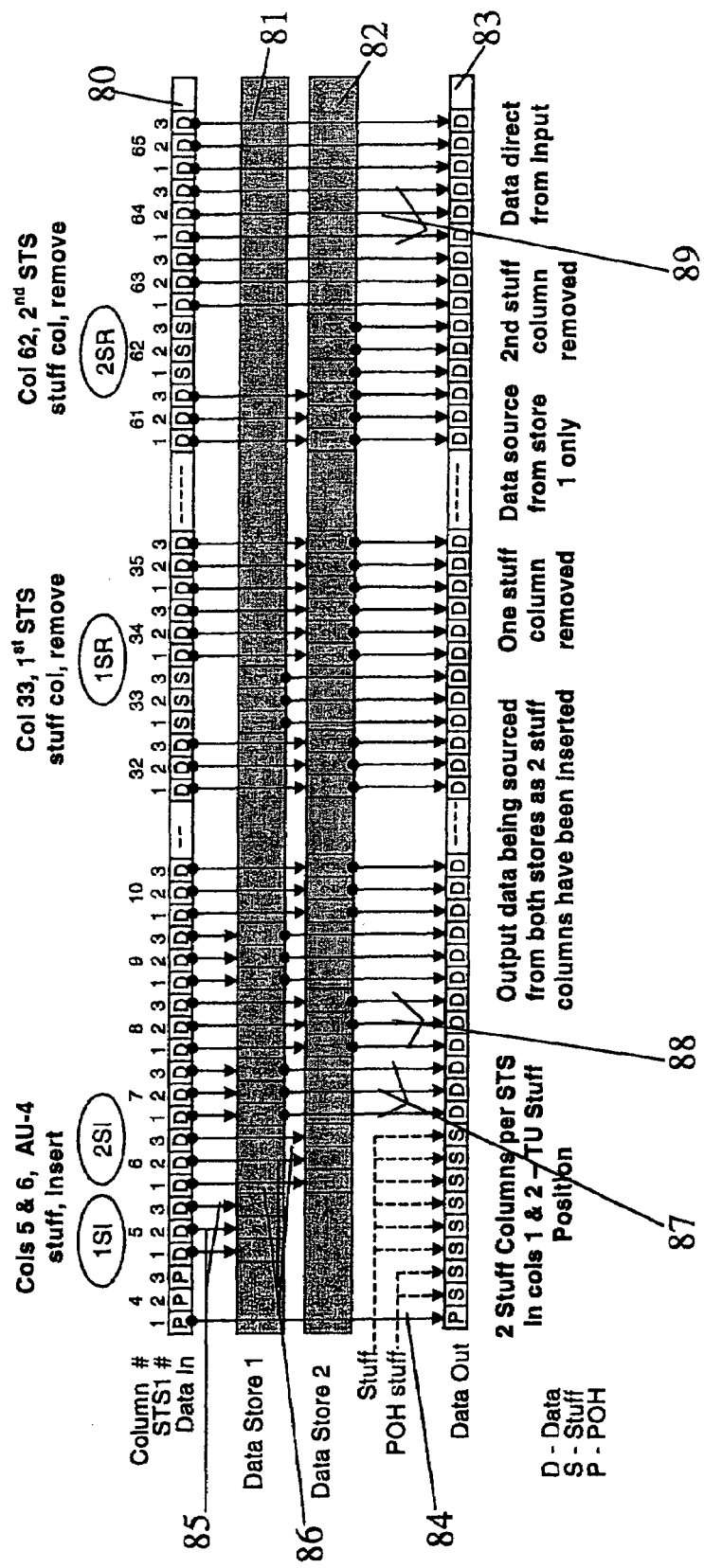
FIG. 8 is a schematic diagram of a method of converting from SONET to SDH.

FIG. 8 is another schematic diagram of the method of converting from SONET to SDH. Row 80 represents input data from a payload of a SONET structure as illustrated in FIG. 5*a*. The letter P stands for path overhead information, the letter D for actual data to be transmitted, and the letter S for stuff data. Column numbers are indicated corresponding to the columns within the high order frame 30 of FIG. 3 (there being 90 columns (each column comprising 3 STS1s) in total for example). As mentioned above there are three payload containers and these are numbered 1, 2, 3. Data from these is interleaved as a result of a multiplexing process as known in the art. This is indicated in FIG. 8 by the row labelled STS1#.

Row 81 represents data store 1 and row 82 represents data store 2. Similarly, row 83 represents data output from the conversion process which is in SDH format as illustrated in FIG. 5*b*.

The first three items of input data in row 80 are path over head data P. As described above with reference to FIGS. 5*a* and 5*b* the SDH format only requires one item of path overhead data. The first item of input data P is therefore written straight to the first item of output data as indicated by arrow 84. Two entries of stuff data are then made in the output data to "fill in" for the path overhead data present in the input SONET form but not required in the output SDH form. This is indicated by the dotted arrows labelled POH stuff.

Next three items of data D arrive in the input data 80 indicated by column 5, STS1 numbers 1 to 3. This data is not yet required to be written to the output SDH form because that SDH form needs to have six stuff entries at the start. The arriving data is therefore stored in data store 1 as indicated by arrows 85.

Next three further items of data D arrive in the input data 80 indicated by column 6, STS1 numbers 1 to 3. Again this data is not yet required to be written to the output SDH form and so it is stored in data store 2 as indicated by arrows 86.

In the meantime, two columns worth of stuff are written into the output (see dotted arrows labelled stuff) giving six S entries in row 83.

Next more items of data D arrive in the input data 80 indicated by column 7, STS1 numbers 1 to 3. These are written into data store 1 as indicated by arrows. In the meantime, the data previously stored in data store 1 from column 5, STS1 numbers 1 to 3 can be written into the output row 83. This is indicated by arrows 87.

The next input data to arrive from column 8 is written into data store 2 and the data previously stored in data store 2 output to the output row 83 as indicated by arrows 88.

Output data continues to be sourced from both data stores in this way until column 33 of input data is reached. This column contains stuff data indicated by S in row 80. This stuff data does not need to be transferred to the output data. It is therefore ignored and the data previously stored in data store 1 sent to the output. Data store 1 is now empty and it is no longer necessary to add a delay of two time intervals. Rather one time interval is sufficient. Therefore only data store 2 is used and the process continues until column 62 of the input data is reached. This column contains stuff data indicated by S in row 80. This stuff data does not need to be transferred to the output data. It is ignored and the data previously stored in data store 2 sent to the output. Both data stores are now empty and it is no longer necessary to add any time delay. The input data is then simply transferred to the output data without any delay as indicated by arrows 89.

The process of FIG. 8 can then be repeated on a row by row basis for any group of three STS1s or an AU-4 enabled for conversion. There is a B3 byte in both SONET and SDH protocol which is regenerated using conventional techniques as known in the art.

Figure 9:
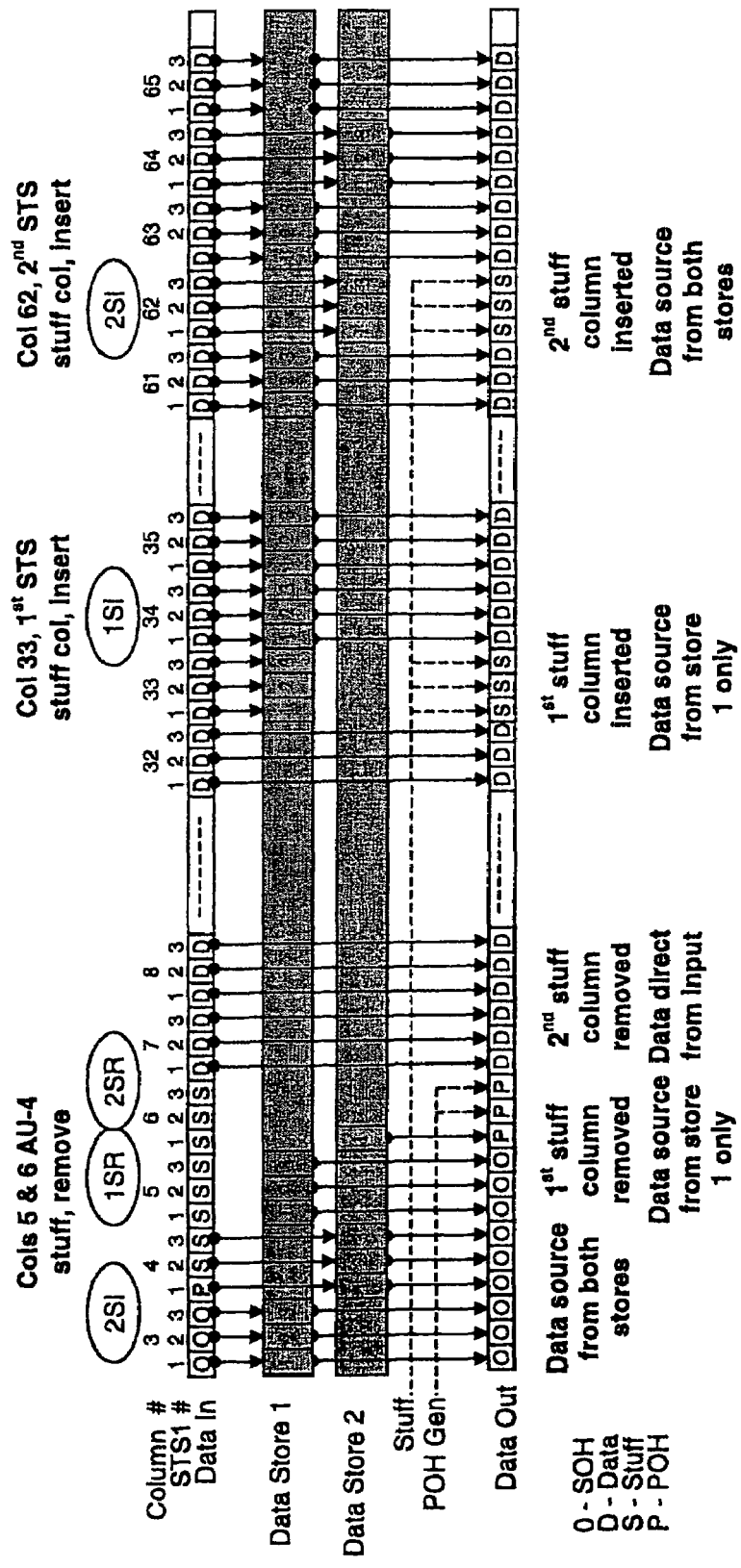
FIG. 9 is a schematic diagram of a method of converting from SDH to SONET.

The method of the present invention is also able to convert from SDH to SONET as well as from SONET to SDH. FIG. 9 is similar to FIG. 8 except that it illustrates the conversion process from SDH to SONET. In as this situation the SDH structure of FIG. 10*a* is to be converted to the SONET structure of FIG. 10*b*.

Figures 10A, 10B:
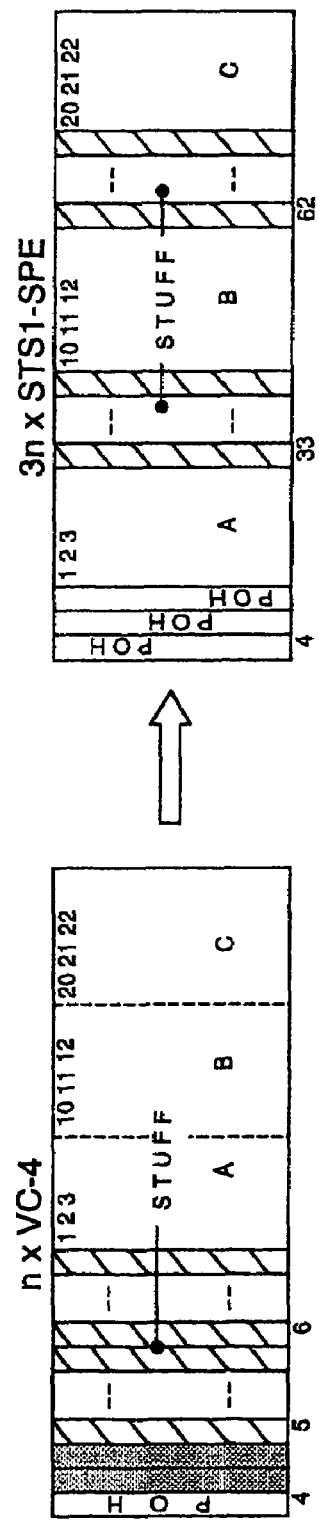

The extra path overhead columns required for the SONET structure of FIG. 10*b* are generated using a conventional path overhead generation block. Also, the two stuff columns per STS, found in columns 2 and 3 (of FIG. 10*a*) need to be removed and two additional stuff columns inserted in columns 30 and 59 of the SONET structure of FIG. 10*b*. The STM1 pointer is passed through to the first STS1 pointer, while the remaining STS1 pointers are regenerated by a pointer generation block. These pointers have a fixed value which is usually 522 as mentioned above.

In the embodiments described above two data stores are described as separate, independent entities. However, this is not essential. The two data stores may be integral with one another such that in effect a single data store is provided, with different parts of that data store being used to enable the two time intervals to be created.

FIGS. 11 to 15 are schematic diagrams of network nodes and use the same reference numerals to refer to the same components where appropriate.

Figure 11:
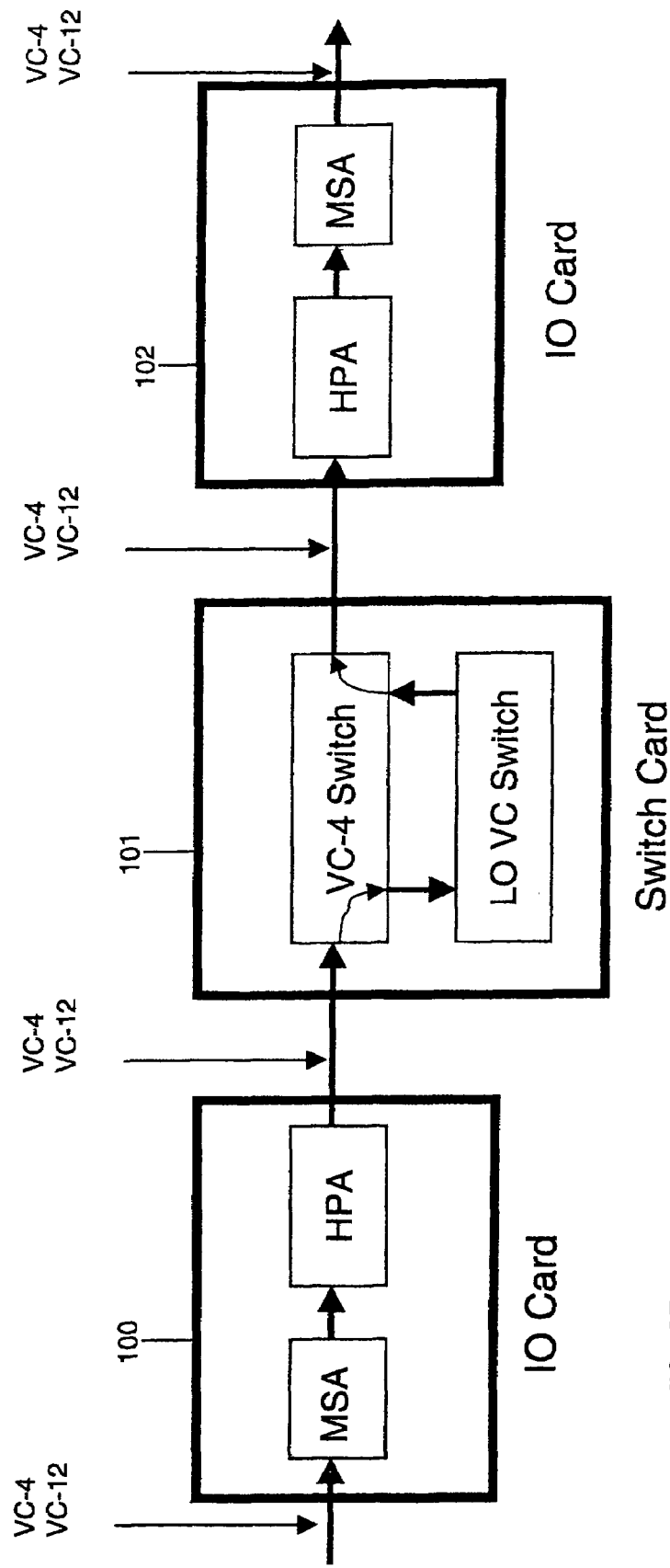
FIG. 11 is a schematic diagram of a network node according to the prior art and for making a VC-12 to VC-12 connection.

FIG. 11 shows a prior art situation in which the network node provides a VC-12 (SDH) to VC-12 (SDH) connection and uses an SDH protocol switch core 101. The network node comprises an input card 100 which receives SDH traffic in the form of VC-4 data structures comprising VC-12 frames. These are processed by a multiplex section adaptation (MSA) process as known in the art, and then by a high order path adaptation (HPA) processor which carries out a VT or TU alignment function as known in the art. The resulting SDH traffic, still in the form of VC-4 data structures comprising VC-12 frames is then input to an SDH switch core 101. This comprises a VC-4 switch and a low order VC switch both of which process the data in series as indicated in FIG. 11. The resulting SDH data, again in the form of VC-4 data structures comprising VC-12 frames is sent to an output card 102 comprising an HPA processor and an MSA processor as known in the art. Finally the traffic is output in SDH form comprising VC-4 data structures with VC-12 frames.

Thus in the prior art situation of FIG. 11 SDH traffic is processed by an SDH switch core 101 and no protocol conversion is required.

Figure 12:
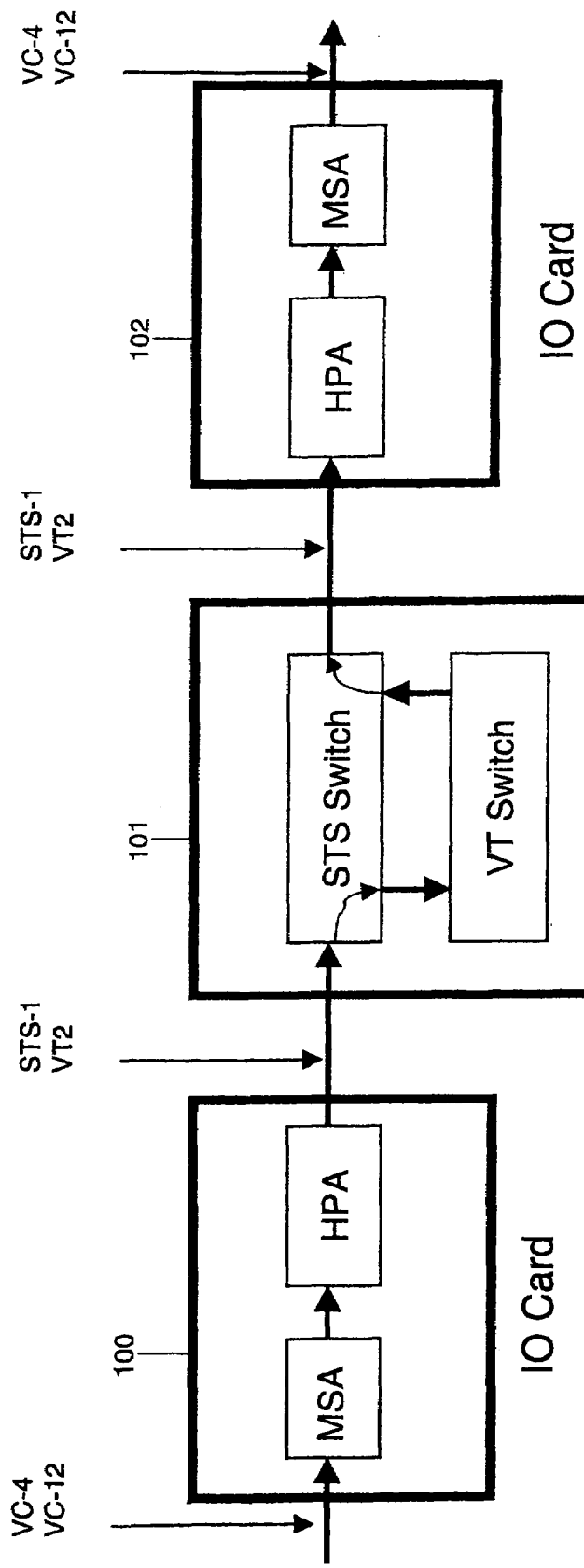
FIG. 12 is a schematic diagram of a network node according to an embodiment of the invention, for making a VC-12 to VC-12 connection.

FIG. 12 illustrates an embodiment of the present invention, with the same situation as FIG. 11 except that the switch core 101 is SONET only. In this case both the input card 100 and the output card 102 comprise a conversion processor. SDH Traffic enters the input card 100 as in FIG. 11 and is converted to SONET form comprising STS-1 payload units comprising VTs lower order data structures. This SONET form traffic is then processed by the switch core 101 which is of SONET type comprising an STS switch and a VT switch. The SONET traffic passes to the output card 102 which comprises a conversion processor to convert it back to SDH form comprising VC-4 data structures with VC-12 frames.

Thus in the example of FIG. 12 protocol conversion takes place on the ingress and the egress of the switch core.

Figure 13:
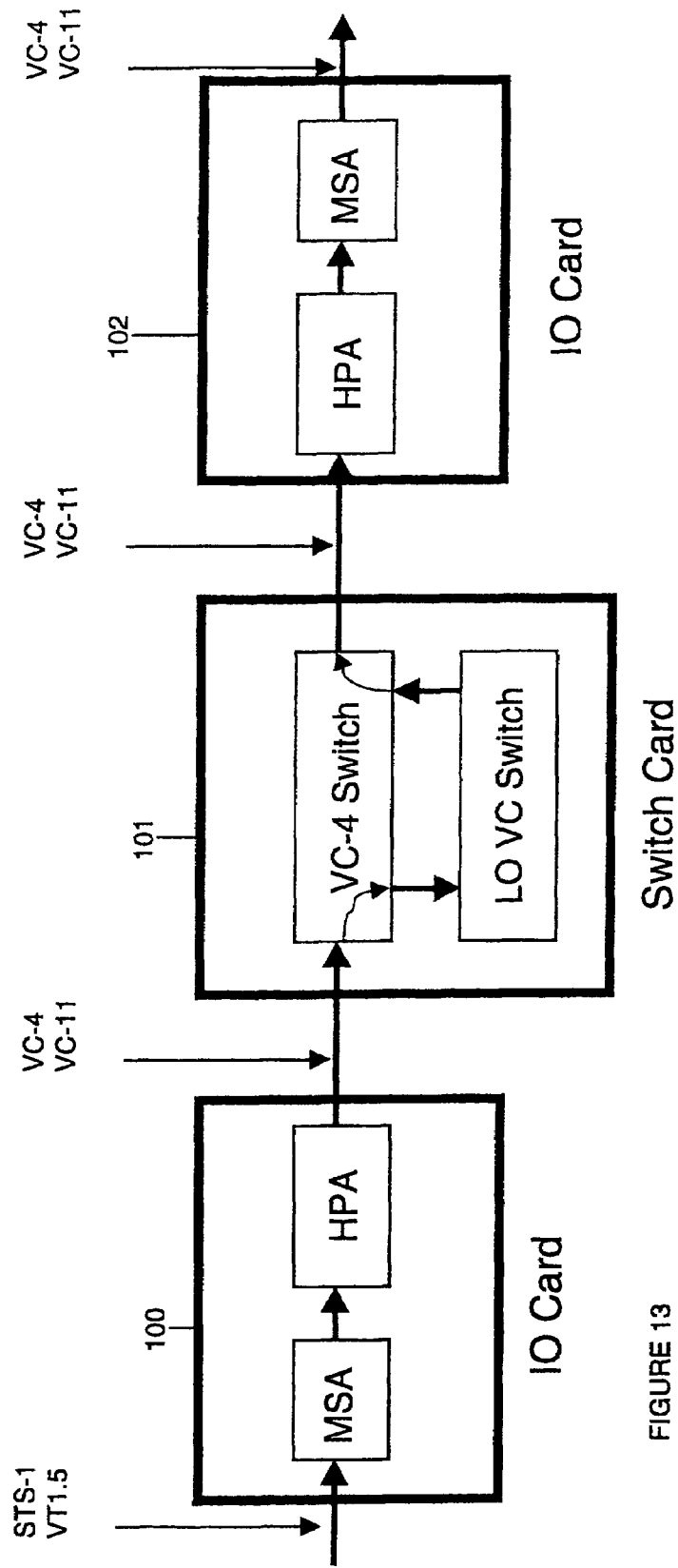
FIG. 13 is a schematic diagram of a network node according to the prior art for making a VT1.5 to VC-11 connection.

FIG. 13 illustrates a prior art situation in which a VT1.5 (SONET) to VC-11 (SDH) connection is provided. Here conversion takes place on the ingress. SONET traffic comprising STS-1s with VT1.5s is received at the input card 100 and converted into SDH form comprising VC-4s with VC-11s. The SDH switch core 101 is then able to process the converted traffic as known in the art and outputs it to the output card 102. The output card processes the traffic using an HPA and MSA and outputs it still in SDH form.

The present invention enables conversion to take place on the egress rather than on the ingress. (As mentioned above, previously, conversion has been possible in conjunction with pointer alignment processes that are used on the ingress but not egress.) For example, FIG. 14 illustrates an embodiment of the invention, similar to that of FIG. 13 but using a SONET only switch core and with conversion on the egress.

Figure 14:
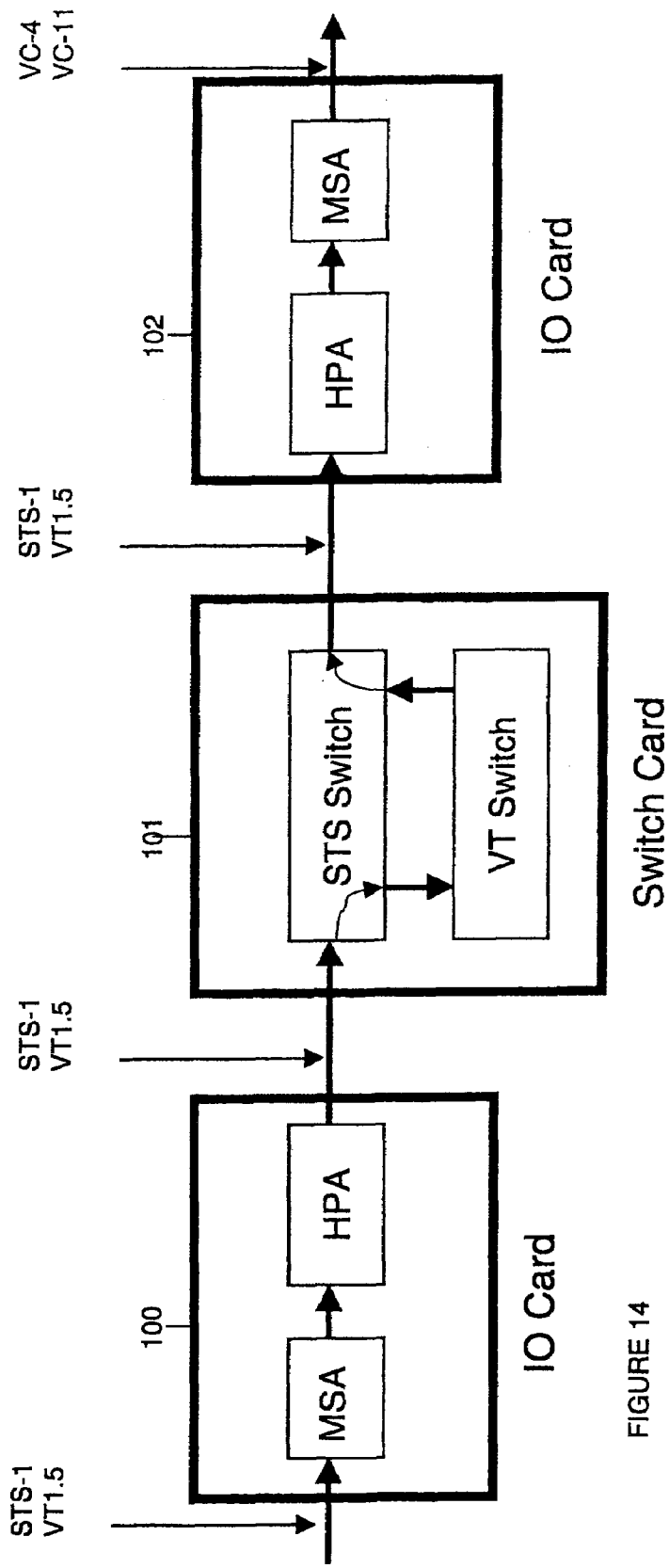
FIG. 14 is a schematic diagram of a network node according to an embodiment of the invention for making a VT1.5 to VC-11 connection.

In FIG. 14, SONET traffic comprising STS-1s with VT1.5s enters the input card 100 and is processed without undergoing protocol conversion. The SONET only switch core 101 processes the traffic as known in the art and outputs it to the output card 102. The output card comprises a conversion processor for converting the SONET traffic into SDH form comprising VC-4s and VC-11s.

FIG. 15 shows the situation for a VC-11 (SDH) to VT1.5 (SONET) connection, which provides the reverse type of connection to that shown in FIG. 14. Here protocol conversion takes place on the ingress only (from SDH to SONET) and the switch core is SONET only. Because protocol conversion takes place on the ingress only this is a prior art situation.

Any range or device value given herein may be extended or altered without losing the effect sought, as will be apparent to the skilled person for an understanding of the teachings herein.

The invention claimed is:

1. A communications network node for use in a synchronous transmission network and arranged to operate with data frames of at least two different protocol types, said two different protocol types being synchronous digital hierarchy (SDH) and synchronous optical network (SONET), said network node comprising:

(a) a single-protocol switch core configured to switch data frames of one of said protocol types; and (b) a conversion processor configured to converting data frames between said two protocol types; said conversion processor being arranged to operate on an ingress of the network node and on an egress of the network node such that data packets frames received at the ingress of the network node which are one-way data frames for passing from one ingress of the network node to one egress of the network node with one pass through the single protocol switch core, which data frames are of a protocol type different from that of the single-protocol switch core, are converted into a form compatible with that of the single-protocol switch core and subsequently, after being processed by the single-protocol switch core, converted back into the protocol type of the received data frames at the egress of the network node.

2. A synchronous transmission network arranged to carry data frames of at least a first protocol type, said protocol type being protocol type being synchronous digital hierarchy (SDH) and synchronous optical network (SONET), said network comprising:

(a) a plurality of network nodes connected to one another by links and wherein each of those network nodes comprises a single-protocol switch core arranged to operate for a second protocol type, different from said first protocol type;

(b) at least one conversion processor provided at each of said network nodes and arranged to convert the data frames between the first and second protocol types; said conversion processor being arranged to operate on an ingress of each network node and on an egress of the network node such that data frames received at the ingress of the network node which are one way data frames for passing from one ingress of the network node to one egress of the network node with one pass through the single protocol switch core are converted into the second protocol type and subsequently, after being processed by the single-protocol switch core, converted back into the first protocol type.

3. A method of carrying data frames of at least a first protocol type over a synchronous transmission network, said protocol type being synchronous digital hierarchy (SDH) and synchronous optical network (SONET), said network comprising a plurality of network nodes connected to one another by links and each comprising a single-protocol switch core adapted to switch data frames of a second protocol type different from said first protocol type, said method comprising the steps of:

(a) receiving data frames at one of the network nodes, the data frames being one way data frames for passing from one ingress of the network node to one egress of the network node with one pass through the single protocol switch core, and converting those data frames into a form compatible with that of the single-protocol switch core;

(b) processing the data frames at the single-protocol switch core of the network node; and (c) converting the output of the single-protocol switch core back into the protocol type of the received data frames.

4. A method as claimed in claim 3 which further comprises the step of outputting the resulting data frames from the network node.

* * * * *